WIDE RASTER CORRECTION FOR A COLOR TELEVISION RECEIVER

Filed Dec. 1, 1967 2 Sheets-Sheet 1

INVENTOR:
REINOLD M. MARVIN,
BY Francis [signature]
HIS ATTORNEY.

April 7, 1970 R. M. MARVIN 3,505,560

WIDE RASTER CORRECTION FOR A COLOR TELEVISION RECEIVER

Filed Dec. 1, 1967 2 Sheets-Sheet 2

INVENTOR:
REINOLD M. MARVIN,
BY
HIS ATTORNEY.

United States Patent Office 3,505,560
Patented Apr. 7, 1970

3,505,560
WIDE RASTER CORRECTION FOR A COLOR TELEVISION RECEIVER

Reinold M. Marvin, Syracuse, N.Y., assignor to General Electric Company, a corporation of New York Filed Dec. 1, 1967, Ser. No. 687,268
Int. Cl. H01j *29/50*
U.S. Cl. 315—13 8 Claims

ABSTRACT OF THE DISCLOSURE

In a multibeam color television receiver, a wide raster size correction assembly includes a ferromagnetic strip which serves to concentrate lines of flux and a spring clip which is secured to the rear of a deflection yoke and receives the ferromagnetic strip in a slot therein. The slot is formed by substantially parallel fingers extending perpendicularly to the axis of the cathode ray tube retaining the ferromagnetic strip therebetween in sliding engagement so as to permit the variable positioning of the strip with respect to the beams of the cathode ray tube.

BACKGROUND OF THE INVENTION

The present invention relates to a color television receiver and more particularly to a means for providing wide raster correction.

In the usual color television receiver, a plurality of electron beams are projected toward a screen in a cathode ray tube from a plurality of electron guns to provide a plurality of primary colors. As the beams are projected toward the screen they are converged by an appropriate apparatus and scanned by an additional apparatus to provide a plurality of rasters each of which corresponds to one primary color corresponding to a phosphor affixed to the screen. As is readily appreciated by those of ordinary skill in the art, the achievement of an appropriate convergence and requisite scanning of the electron beams is difficult since the electron guns are positioned off the axis of the cathode ray tube.

As a result of this off-axis positioning, a number of convergence problems arise. One of these problems is that of "trapezoidal distortion" or "keystoning" which is in effect a skewing of rasters. In the common delta configuration for a color cathode ray tube, this problem manifests itself in the nonparallel nature of the red and green rasters along the upper and lower edges of the cathode ray tube screen. While this problem has been troublesome in the past, the state of the art today is such that correction is possible by utilizing adjustably mounted, pairs of passive ferromagnetic strips which are parallel to the axis of the cathode ray tube.

Another common problem although not to be confused with that of "keystoning" is a phenomenon referred to in the context of a conventional delta configuration, as "wide blue." As the name suggests, the problem is simply that of a blue raster of greater width than desired either along a portion of or the entire vertically extending edges of the screen. While the prior art has sought to control blue lateral problems, it has done so with permanent magnets or active ferromagnetic means and dynamic correction coils which are difficult to adjust, relatively complex, and quite expensive. Furthermore, the correction means have acted primarily upon the position of the beam rather than the magnetic field producing scanning.

SUMMARY OF THE INVENTION

Therefore, and in view of the prior art, it is an object of this invention to provide a wide raster size correction which acts upon the field producing scanning.

It is also an object of this invention to provide a wide raster size correction which is readily adjustable at a reduced cost.

In one embodiment of the invention, there is provided a passive field redistributing means adjacent the yoke of a cathode ray tube which is asymmetrically positioned with respect to the axes of a plurality of electron beams.

In the more specific aspects of the embodiment, there is provided a passive ferromagnetic member which is retained in a support means secured to the rear of the deflection yoke. The member is maintained in sliding engagement with parallel, resilient fingers extending substantially perpendicular to the electron beam axes. When the member is positioned nearer one of the plurality of electron beams than the others, the total magnetic flux near that electron beam will be reduced to effect a change in the overall size of the raster generated from that beam.

BRIEF DESCRIPTION OF THE DRAWINGS

This specification concludes with claims particularly pointing out and distinctly claiming the subject matter which is regarded as the invention. The invention may also be understood from the following description taken in connection with the accompanying drawings in which:

DESCRIPTION OF THE PREFERRED EMBODIMENT

Figure 1:
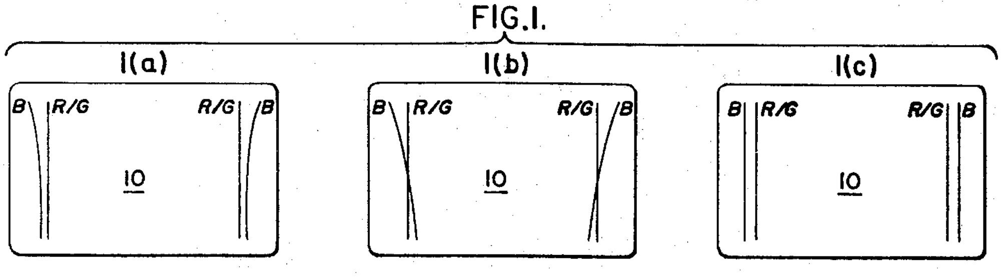
FIGURE 1 (*a–c*) represents the wide raster problem as manifested in a conventional delta configuration.

As illustrated in FIGURE 1, the wide raster problem is primarily limited to "wide blue" in the conventional delta configuration utilized today. In that configuration, the blue gun which is located on the projected vertical axis of the screen results in a distorted blue raster which lies outside the converged red and green rasters R/G on a screen 10. As shown in FIGURE 1 (a), the blue raster B is wider than the red and green rasters, R/G at the bottom of the screen 10 and of increasing width approaching the top of the screen 10. Another manifestation of the problem as shown in FIGURE 1 (b) is similar to that previously described except that the blue raster is narrower than the red and green rasters, R/G near the base of the screen 10. Finally, FIGURE 1 (c) illustrates the problem wherein the blue raster B is of uniform width but of a greater width than the red and green rasters R/G all along the vertical edges of screen 10. While the exact nature of the misconvergence problem varies as shown in FIGURE 1, there is one aspect that all three forms of the problem have in common. That aspect is that the blue raster B is of greater width along some horizontal line on the screen 10 than are the red and green rasters R/G. It is this common aspect which allows this invention to deal with substantially all forms of the wide raster problem be it "wide blue" inherent in the conventional delta system or a related wide raster problem of another system.

Figure 2:
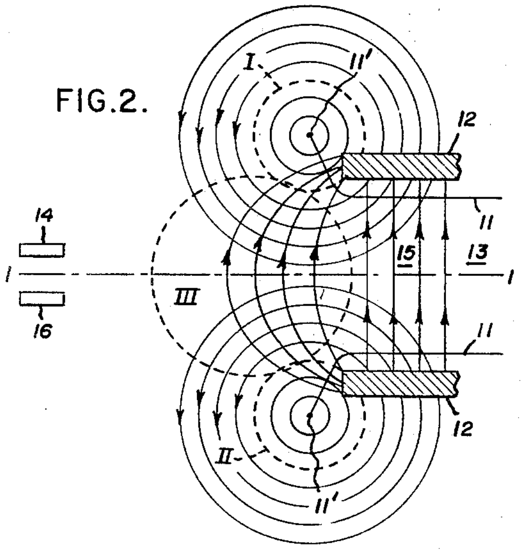
FIGURE 2 is a cross-sectional view of the flux path in a deflection yoke as generated by current flowing in a deflection coil.

In order to appreciate the problems associated with achieving a uniform raster, let us refer now to FIGURE 2 for an understanding of the means by which a raster is formed. As shown there, coil 11 with end turns 11' are wound upon a core 12 to form a deflection yoke 13 for a cathode ray tube. As the current flows through the deflection coil 11 and end turns 11' as indicated by the arrowheads, lines of flux will be generated about the core 12 within the areas I and II. But most significantly, lines of flux will be generated within the areas I and II affecting the cumulative magnetic field including flux lines 15. Ideally of course, the blue raster B and the red and green rasters R/G would fall upon one another, unlike the rasters shown in FIGURE 1 (*a–c*). If the yoke 13 of FIGURE 2 were able to operate in a cathode ray tube environment wherein the electron guns 14 and 16 coincided with the axis 1 of the cathode ray tube, the coincidence of the blue raster B and the red and green rasters R/G could be accomplished without correction. Unfortunately, this is impossible in a multi-beam cathode ray tube.

Figure 3:
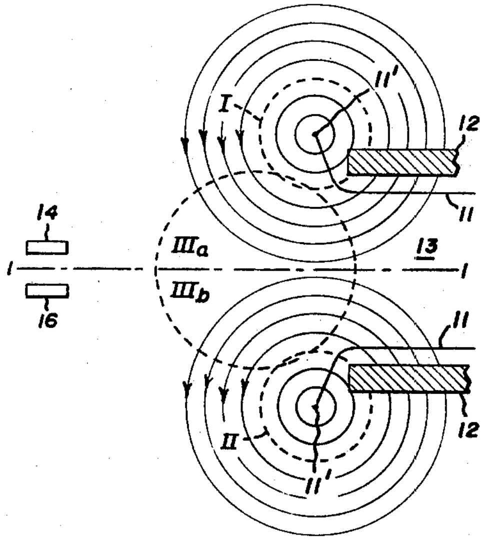
FIGURE 3 is a cross-sectional view of a deflection yoke illustrating uncorrected areas of flux generated by the yoke.

With the configuration of FIGURE 3, the total flux within the area III (*a* and *b*) as generated by current flowing through the coil 11 and 11' is substantially symmetric with respect to the axis 1 of the cathode ray tube. However, if the total flux in the upper semicircle III(*a*) is reduced, the overall width of a raster generated by an electron beam from an electron gun 14 above the axis 1 would be reduced. The same is of course also true of the flux within the semicircle III(*b*) which would generate a raster from the beam projected by the electron gun 16. Or said another way, if electron gun 14 were in actually the blue gun of a conventional television receiver and the electron gun 16 were in actuality the red or green guns of a conventional television receiver of the delta configuration, a reduction of the flux within the semicircle III(*a*) with respect to the flux within the semicircle III(*b*) would substantially reduce or eliminate the "wide blue" distortion as illustrated in FIGURE 1.

The problem then is one of finding a means by which the amount of flux within a semicircle III(*a*) or III(*b*) may be reduced and do so in an economical fashion with a means which is fully adjustable. In order to do so, it is not necessary to introduce additional or active magnetic means as was done in the prior art. Rather, it is only necessary to introduce a passive flux redistributing means in the form of a passive ferromagnetic material 18 of sufficiently low reluctance to concentrate the lines of flux within the area I. Since the lines of flux will seek out the path of least reluctance as now represented by the area I, the total flux within the area III(*a*) would be substantially reduced with respect to that of III(*b*) without a substantial effect upon lines of flux within the latter area. Thus, by an asymmetric placement of the ferromagnetic material 18 with respect to the axis 1 of the cathode ray tube, it is possible to effect the raster width produced by the beam from the electron gun 14 without substantially affecting the width of the raster produced by the beam from the electron gun 16. Or, again analogizing to the conventional delta configuration, it is possible to affect the width of the raster produced by the blue electron gun, analogous to the electron gun 14, without affecting the raster width of the beam produced by the red or green guns, analogous to the electron gun 16.

Figure 4:
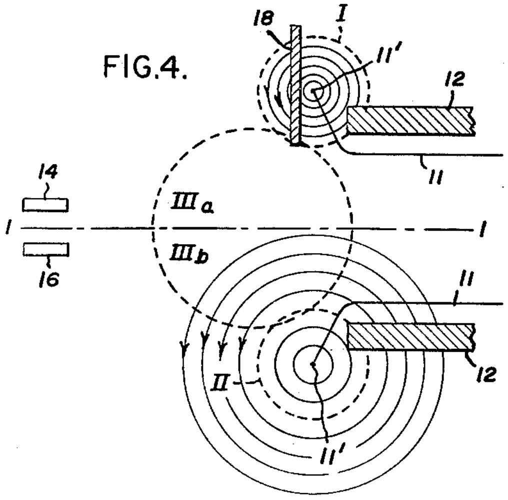
FIGURE 4 is a cross-sectional view of a deflection yoke with corrected areas of flux.
Figures 5, 6, 7, 8:
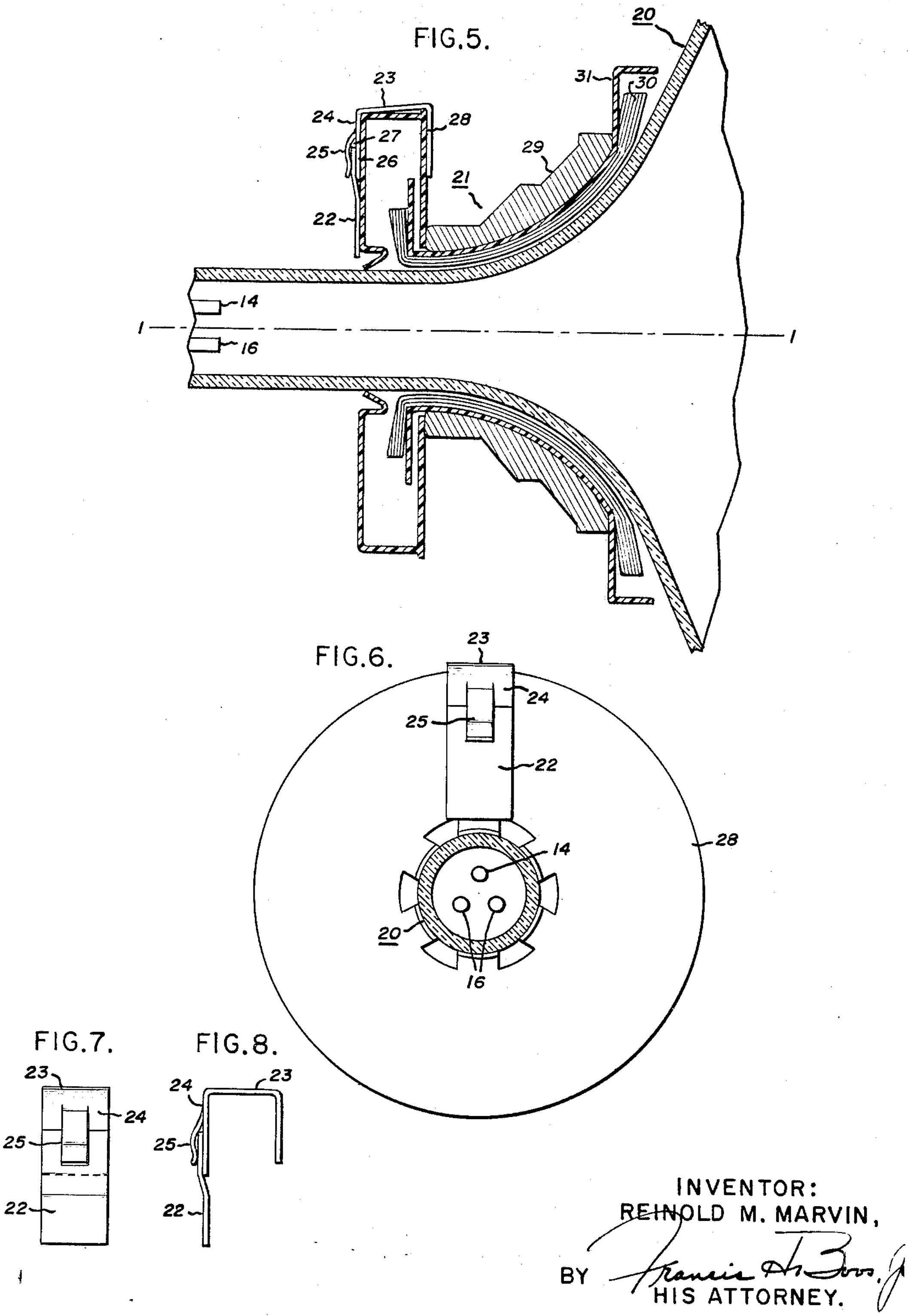
FIGURE 5 is a cross-sectional view of a cathode ray tube with a deflection yoke including wide raster correction means.
FIGURE 6 is a rear view of the yoke mounted on the cathode ray tube including the wide raster correction means.
FIGURE 7 is a rear view of the wide raster correction means alone.
FIGURE 8 is a side view of the correction means alone.

A specific means for obtaining wide raster correction is disclosed in FIGURE 5 wherein a cathode ray tube 20 is disclosed in combination with a yoke assembly 21. As in FIGURES 3 and 4, electron guns 14 and 16 are positioned on opposite sides of the axis 1 of the cathode ray tube 20. In the specific case illustrated, the passive ferromagnetic member comprises an elongated strip 22 with an axis of elongation normal to the axis 1 of the cathode ray tube.

In order to retain strip 22 in place and provide an adjustability consistent with the objectives of the invention, a U-shaped spring clip 23 caps a rear plastic housing 28 of the deflection yoke 21, which U-shaped clip includes a leg 24 with resilient fingers 25 and 26 defining a slot 27. Thus, the strip 22 may be moved into and out of the slot 27 to redistribute the lines of flux around the ferromagnetic core 29 wound by the horizontal deflection coil 30 and separated therefrom by the plastic yoke support 31. It may be seen in FIGURE 6 that the passive ferromagnetic strip 22 which is received by the U-shaped clip 23 will substantially reduce the lines of flux in the path of the electron beam projected from the gun 14 as compared to the electron beams projected from the gun 16.

FIGURES 7 and 8 disclose the U-shaped clip 23 mated with the ferromagnetic strip 22 in both front and cross-sectional views so that the overall simplicity of the structure may best be appreciated. It should of course be appreciated by one of ordinary skill in the art that the precise shape of the ferromagnetic member and a means for supporting the same may be varied considerably and remain within the scope of the invention.

Although a specific embodiment of the invention has been shown and described, it is not desired that the invention be limited to the particular form shown, and it is intended by the appended claims to cover all modifications within the spirit and scope of the invention.

What is claimed as new and desired to be secured by Letters Patent of the United States is:

1. In a color television receiver comprising a plurality of electron guns, a deflection yoke including a core, with a plurality of deflection coils, and a screen, each of the plurality of electron guns producing a beam which is caused to scan the width of the screen by the deflection yoke to produce a plurality of rasters corresponding to the plurality of electron guns, the improvement comprising passive magnetic flux redistributing means positioned outside the core adjacent the end turns of the yoke to act directly upon the yoke to redistribute the flux generated by the yoke, said means being positioned nearer one of the plurality of electron guns than the others so as to affect the width of the raster corresponding to the said one of the plurality of electron guns.

2. The improvement in a color television receiver as recited in claim 1 wherein said flux redistributing means comprises a passive ferromagnetic material positioned adjacent the end turns of the yoke.

3. The improvement in a color television receiver as recited in claim 2 wherein said flux redistributing means comprises a strip.

4. The improvement in a color television receiver as recited in claim 3 wherein said strip is substantially perpendicular to the beam produced by each of the plurality of electron guns.

5. The improvement in a color television receiver as recited in claim 4 including a support means secured to said yoke nearest the plurality of electron guns, said support having a slot receiving said strip in sliding engagement.

6. The improvement in a color television receiver as recited in claim 5 wherein said support means comprises two resilient fingers forming the slot, said fingers extending substantially perpendicular to the beams produced by each of plurality of electron guns.

7. The improvement in a color television receiver as recited in claim 6 wherein said support means comprises a U-shaped clip secured to the end of said yoke adjacent the electron guns, said U-shaped clip comprising one leg including said resilient fingers.

8. The improvement in a color television receiver as recited in claim 2 wherein said flux redistributing means concentrates the lines of flux generated by the yoke end turns adjacent to it to thus reduce the line of yoke generated flux in the path of an electron beam projected from said one gun as compared to the lines of yoke generated flux in the paths of electron beams projected from said others of said guns and thereby reduce the width of the raster produced by said one gun.

References Cited

UNITED STATES PATENTS

| | | | |
|---|---|---|---|
| 2,569,517 | 10/1951 | De Leon | 335—211 |
| 2,598,916 | 6/1952 | Ingle et al. | 335—211 |
| 2,880,367 | 3/1959 | Caprio. | |
| 3,020,434 | 2/1962 | Bloomsburgh | 313—76 |

| | | | |
|---|---|---|---|
| 3,307,067 | 2/1967 | Jachim et al. | |
| 3,354,336 | 11/1967 | Rennick | 335—210 XR |

RODNEY D. BENNETT, Jr., Primary Examiner

M. F. HUBLER, Assistant Examiner

U.S. Cl. X.R.

313—76; 335—211